No. 668,085. Patented Feb. 12, 1901.
C. C. BOWEN.
ANIMAL TRAP.
(Application filed Mar. 8, 1900.)
(No Model.) 2 Sheets—Sheet 1.
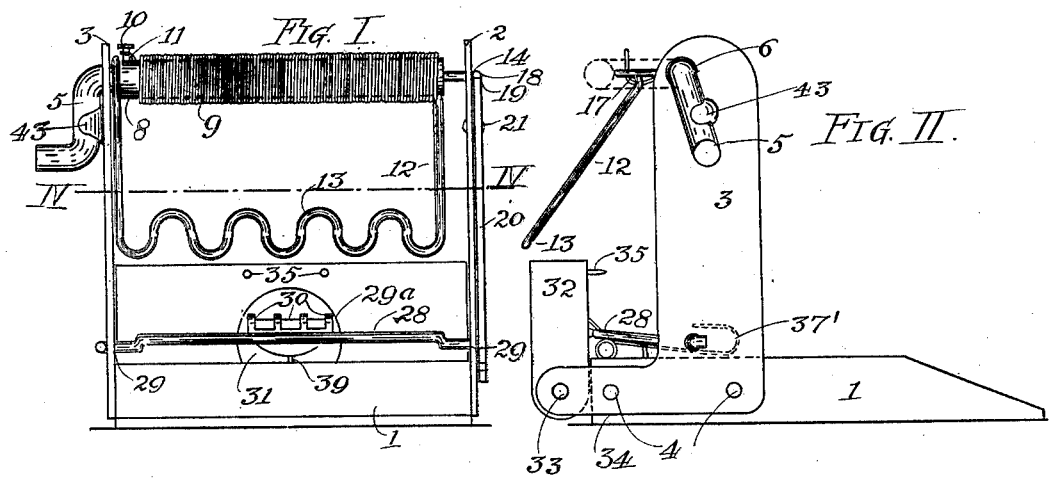
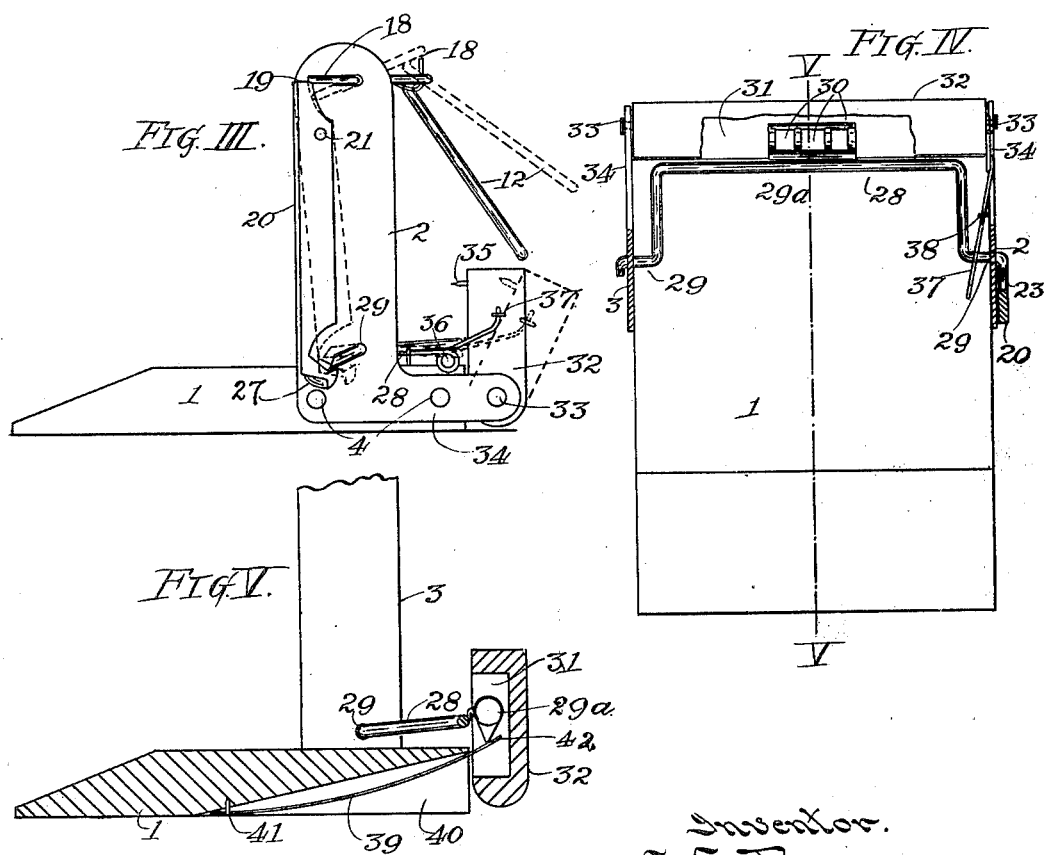

No. 668,085. Patented Feb. 12, 1901.
C. C. BOWEN.
ANIMAL TRAP.
(Application filed Mar. 8, 1900.)
(No Model.) 2 Sheets—Sheet 2.
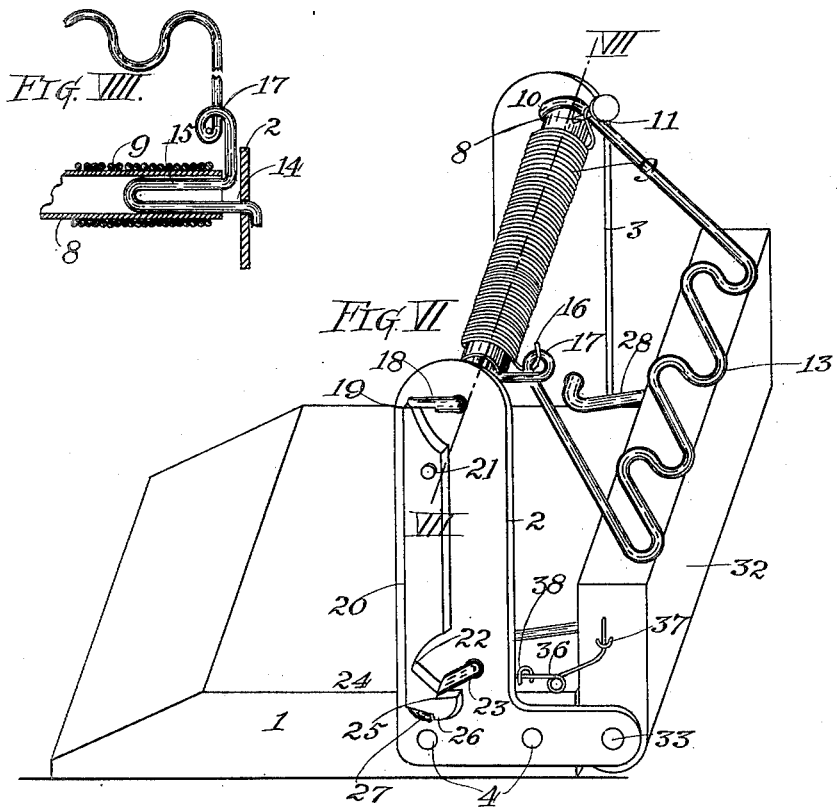
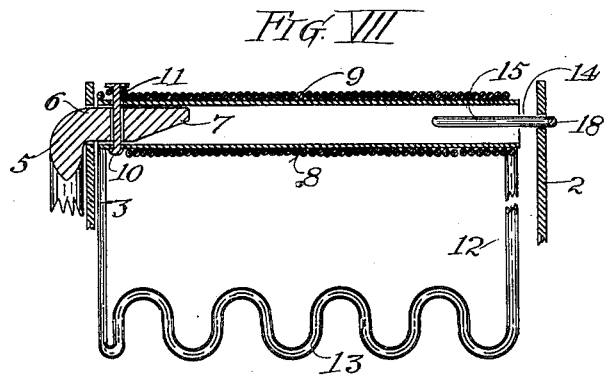

UNITED STATES PATENT OFFICE.

CALVIN C. BOWEN, OF LOS ANGELES, CALIFORNIA, ASSIGNOR TO THE CYCLONE TRAP COMPANY, OF SAME PLACE.

ANIMAL-TRAP.

SPECIFICATION forming part of Letters Patent No. 668,085, dated February 12, 1901.

Application filed March 8, 1900. Serial No. 7,924. (No model.)

*To all whom it may concern:*

Be it known that I, CALVIN C. BOWEN, a citizen of the United States, with residence and post-office address at 1416 Carroll avenue, in the city of Los Angeles, county of Los Angeles, and State of California, have invented certain new and useful Improvements in Animal-Traps, of which the following is a full, clear, and exact description, reference being had to the accompanying drawings, which form a part of this specification.

My invention relates to that class of animal-traps in which the animal is killed outright and the trap is automatically reset for the succeeding animal; and my invention consists in certain features of novelty hereinafter described and claimed.

Figure I is a rear elevation of my improved trap. Fig. II is a side elevation of the same. Fig. III is a side elevation showing the opposite side from Fig. II. Fig. IV is a transverse section taken on line IV IV, Fig. I. Fig. V is a longitudinal section taken on line V V, Fig. IV. Fig. VI is a perspective view. Fig. VII is a transverse section taken on line VII VII, Fig. VI. Fig. VIII is a detail view showing the revoluble sleeve journaled to the striker-rod.

Referring to the drawings, 1 represents a base-block for supporting the various parts of the trap, and 2 3 vertical standards secured at 4 to the base-block.

5 represents a crank journaled at 6 to the standard 3 and having an inwardly-extending stub 7.

8 represents a sleeve interposed between the standards 2 3, with an actuating-spring 9 coiled thereon. One end of the sleeve 8 is secured to the stub 7 by means of a pin 10, which passes through said sleeve and stub, one end of the sleeve telescoping the stub 7. One end of the actuating-spring 9 is secured at 11 to the pin 10.

12 represents a striker-rod having a return-bend striker 13 on its outer end, said striker being adapted to revolve between the standards 2 3. The striker-rod 12 is journaled at 14 to the standard 2 and is provided with an inwardly-extending return-bend 15, on which one end of the sleeve 8 is journaled. One end of the actuating-spring is secured at 16 to a loop 17 in the striker-rod, the result being that as the crank 5 is wound up the actuating-spring brings tension upon the striker-rod and striker.

18 represents an arm on the outer end of the striker-rod outside of the standard 2 and extending parallel therewith, said arm when the trap is set having its outer end resting upon a shoulder 19 on the upper end of a pendent lever 20, said lever being pivoted above its center to the standard 2, as shown at 21. The lower end of the lever 20 is provided with a notched orifice 22, in which operates a trigger 23, said trigger having a point 24 on its outer end, which engages in a groove 25 when the trap is set.

26 represents a shoulder on the lower end of the lever 20, said shoulder engaging a boss 27 in its backward swing when the trap has been set off, said boss and shoulder thus limiting the backward swing of the lever 20.

28 represents a bail-shaped trigger-rod having its ends journaled at 29 to the standards 2 3, the trigger 23 being an integral part of the trigger-rod 28.

29$^a$ represents a bait-box secured to the trigger-rod 28, preferably near the middle of the same, said bait-box having upper orifices 30 to permit the animal to reach the bait. The bait-box 29$^a$ is supported by the trigger-rod 28 in a recess 31, cut out of the inner side of a striker-block 32, said striker-block being pivoted at 33 to foot extensions 34 of the standards 2 3. The striker-block 32 is adapted to rock backwardly, as shown in dotted lines in Fig. III, and is provided with pointed brads 35, placed above the bait-recess 31. The striker-block 32 is held normally in a vertical position by means of a coiled-spring rod 36, having its outer end secured at 37 to one end of the striker-block. The striker-block is limited in its backward swinging by means of the opposite end of the spring-rod 36 being hooked over the trigger-rod, as shown at 37', the hook being of sufficient length to give the necessary play to the striker-block.

38 represents a staple for holding the spring-rod 36 down to the base-block 1.

39 represents a flat spring resting in a recess on the under side of the base-block 1 and having its inner end secured at 41 to said base-block, the outer end of said spring pressing against the under side of the bait-box 29, as shown at 42, thus normally holding the bait-box and inner side of the trigger-rod in a raised position.

43 represents a boss on the standard 3 for limiting the backward movement of the crank 5.

The operation is as follows: The trap being set when in the position shown in full lines in Figs. II, III, and VII, the point 24 of the trigger engages the groove 25 at the lower end of the lever 20, the outer end of the arm 18 resting upon the shoulder 19 at the upper end of the lever 20. As the animal attacks the bait, the trigger-rod 28 is forced downwardly, the point 24 of the trigger being thrown upwardly into the notch 22, thus permitting the lever 20 to swing on its pivot 21, the upper end swinging backwardly, as shown in dotted lines in Fig. III, thus allowing the arm 18 and its connections, including the striker 13, to make one revolution, knocking the animal up against the striker-block 32 and the brads fixed thereto, the force of the striker causing the striker-block to move upwardly on its pivot, throwing the dead animal from the trap and permitting the striker to swing clear of the striker-block, the spring 36 returning the striker-block to its vertical position and the spring 39 throwing the trigger-rod upwardly and setting the trigger for the next animal.

I claim as my invention—

1. In an animal-trap the combination of a base, suitable standards, a striker pivoted to the standards, a striker-block having pivotal connection with the base, a recess in the striker-block, a trigger-rod journaled to the standards and a bait-receptacle on the trigger-rod extending into the recess in the striker-block, substantially as set forth.

2. In an animal-trap the combination of a suitable base, standards secured to the base, a revoluble striker journaled to the standards, a trigger-rod journaled to the standards, a striker-block pivoted to the standards and having a recess, a bait-receptacle connected with the trigger-rod and extending into the recess, and a spring secured to the base for normally holding the trigger-rod and bait-receptacle in a raised position, substantially as set forth.

3. In an animal-trap the combination of a suitable base, standards secured to the base, a striker journaled to the standards, a bail-shaped trigger-rod carrying a bait-box journaled to the standards and having a trigger thereon, a pendent lever, an arm connected with the striker and adapted to engage the pendent lever, and a recess in the pendent lever with which the trigger engages, substantially as set forth.

4. In an animal-trap the combination of a base, standards secured to the base, a striker-rod journaled to one of said standards, a sleeve, an actuating-spring coiled thereon, a return-bend in the striker-rod on which the sleeve is journaled, an arm on the striker-rod, a pendent lever, a shoulder on the pendent lever with which the arm engages, a trigger-rod journaled to the standards, a trigger on the rod, a point on the trigger extending into a notched recess in the pendent lever, a boss on one of the standards and a shoulder on the pendent lever adapted to engage said boss, substantially as set forth.

5. In an animal-trap the combination of a base, standards secured to the base, a striker journaled to the standards, a pivoted striker-block having a bait-recess, brads secured to the striker-block above the recess, a trigger-rod journaled to the standards, a bait-box on the trigger-rod, and an aperture in the bait-box for the free access of the animal to the bait, substantially as set forth.

6. In an animal-trap the combination of a base-block, standards secured to the block, a revoluble striker journaled to the standards, a pivoted striker-block, a coiled-spring rod having one of its ends secured to the striker-block, a bail-shaped trigger-rod carrying a bait-box, and an elongated hook on the coiled-spring rod for engaging said trigger-rod, substantially as set forth.

CALVIN C. BOWEN.

Witnesses:
JAS. E. KNIGHT,
J. A. ROELOFSZ.